United States Patent
Herold et al.

[11] Patent Number: 5,931,432
[45] Date of Patent: Aug. 3, 1999

[54] RECESSED-MOUNTED HOUSING

[75] Inventors: Robert T. Herold, Clovis; Deborah A. L'Heureux, Fresno; James F. Arbuckle, Fresno; Gregory S. Giroux, Fresno, all of Calif.

[73] Assignee: Pelco, Clovis, Calif.

[21] Appl. No.: 09/061,687

[22] Filed: Apr. 16, 1998

[51] Int. Cl.⁶ ..................................................... B42F 13/00
[52] U.S. Cl. ........................... 248/343; 248/906; 362/365
[58] Field of Search ..................................... 248/343, 906, 248/342, 316, 345; 362/365, 366, 368, 374

[56] References Cited

U.S. PATENT DOCUMENTS

| | | | |
|---|---|---|---|
| 3,780,209 | 12/1973 | Schuplin | 248/906 X |
| 4,048,491 | 9/1977 | Wessman | 248/343 X |
| 4,250,540 | 2/1981 | Kristofek | 362/368 |
| 4,636,924 | 1/1987 | Targetti | 362/277 |
| 4,673,149 | 6/1987 | Grote | 248/343 |
| 4,733,339 | 3/1988 | Kelsall | 362/366 |
| 5,068,772 | 11/1991 | Shapiro | 362/365 |
| 5,077,650 | 12/1991 | Cestari | 362/365 |
| 5,314,148 | 5/1994 | Jones | 248/27.3 |
| 5,349,510 | 9/1994 | Jordan | 362/374 |
| 5,410,782 | 5/1995 | Holyoake | 24/505 |
| 5,725,302 | 3/1998 | Sirkin | 362/365 |

*Primary Examiner*—Ramon O. Ramirez
*Attorney, Agent, or Firm*—Prince, Yeates & Geldzahler

[57] ABSTRACT

A system for mounting a recessed electrical or electronic device housing in (behind or above) a wall or ceiling surface utilizes a pair of resilient spring clips that are threadedly attached to respective diametrically opposed threaded screws. The threaded screws are accessible from the front surface of the housing so that the recessed-mounted housing may be inserted into a hole in the wall or ceiling material and fixedly mounted therein by rotating the screws from the front (ceiling or wall) surface of the housing. Each spring clip includes a bearing tab that bears down against the back side of the wall or ceiling material to sandwich the ceiling material between the bearing tab and an annular flange on the front, open end of the housing. Each threaded screw is journaled in a shouldered bushing which is press-fitted into the housing annular flange. The length of the shouldered bushing approximates the thickness of the ceiling or wall material so that, when the spring clip bearing tab bears down against the back side of the ceiling or wall material, the bearing tab is essentially coplanar with the back side of the material in order to distribute the retaining force of the housing and the weight of the housing and its contents over a maximum area of the ceiling or wall material in contact with the spring clip bearing tab. The spring clip is adapted to compress slightly inwardly (toward the housing) as the housing is inserted into a hole in the ceiling or wall material, springing back outwardly in a manner to grip the back side of the ceiling or wall material once the spring clip is beyond the back surface of the ceiling or wall material. Thereafter, tightening the spring clip down against the back side of the ceiling or wall material retains the recessed-mounted housing in place.

45 Claims, 3 Drawing Sheets

RECESSED-MOUNTED HOUSING

BACKGROUND OF THE INVENTION

1. Field of the Invention

The present invention relates to a recessed-mounted housing, suitable for mounting electric and electronic devices therein, and more particularly relates to a combination recessed-mounted housing and spring mounting clip apparatus for quickly, securely, and easily mounting and retaining an electronic device housing recess-mounted in a wall or ceiling.

2. Description of the Prior Art

Recessed-mounted electric and electronic device housings are well known in the industry. Such housings (commonly called "canisters") provide a mounting structure for mounting recessed-mounted lights in ceilings, for instance. U.S. Pat. No. 5,068,772 shows such a recessed lighting canister adapted to be inserted and positioned into a drywall or "suspended" ceiling. The canister enclosure includes apparently three spring mechanisms that are slightly bowed outwardly from the canister. As the canister is inserted through the drywall or suspended ceiling, the three slightly bowed springs flatten out against the canister against the force of the ceiling material. Once these three spring members are beyond the back of the ceiling material, they spring back outwardly into their slightly bowed orientations in order to retain the canister behind (above) the ceiling material. These spring members can thereafter be locked in position to retain the canister in place in the ceiling. U.S. Pat. No. 4,733,339 also shows a recessed lighting canister having manually adjustable clips that are connected to the side walls of the canister in a manner similar to that shown in U.S. Pat. No. 5,068,772. The retaining clips, however, are intended to be manually bent outwardly, once beyond the back surface of the ceiling material, and manually locked in place, to thereby retain the canister above the ceiling material.

U.S. Pat. No. 5,314,148 shows a recessed-mounted light canister having a plurality of spring clips that are manually insertable into a plurality of sets of slots in the canister side wall, corresponding to various thicknesses of ceiling material, to retain the canister in place. U.S. Pat. No. 4,636,924 shows a recessed lighting canister having manually operable spring clips that are inserted into the canister from a direction opposite that shown in the U.S. Pat. No. 5,314,148 patent. All of these devices require access to the interior of the canister or access to the area behind the ceiling in order to "set" or "lock" the canister in recessed position above the ceiling material.

U.S. Pat. No. 4,673,149 is a similar recessed-mounted canister for mounting a loud speaker therein. This canister is held in position above or behind the ceiling or wall material by three "L" shaped ears that are pushed outwardly behind the ceiling or wall material from within the canister, and then screw-attached to the canister side wall to hold the canister in place. This recess-mounted canister also requires internal access in order to "set" the canister in a ceiling or wall.

U.S. Pat. No. 5,349,510 shows a recessed lighting canister having a lens or light defuser contained within a ring that is clip-mountable into a recess in the opening of the canister. The lens ring is hinged to the canister and is held in place by two spring clips.

U.S. Patent No. 5,410,782 also shows a recessed lighting housing held in place by a plurality of over-center spring and latch mechanisms for holding respective rotatable ears down against the back (upper) surface of the ceiling material to hold the recessed lighting fixture in position. This device requires access to the area behind the ceiling in order to install the housing.

In the area of recessed closed circuit TV (CCTV) surveillance camera mountings, to which the present invention is directed, recessed-mounted canisters (commonly called "back boxes" in the industry), are typically "hard mounted" by screws, bolts, etc. directly to structural elements (beams, joists, etc.) behind or above the ceiling, soffit, etc. into which the CCTV camera is to be mounted. This procedure generally requires pre-drilling hardware mounting holes in the structural elements, in addition to the back box hole in the ceiling material. Frequently, pre-drilling the hardware mounting holes requires access to the area above the ceiling, soffit, etc., which is not always easily accessible.

OBJECTS OF THE INVENTION

It is a primary object of the present invention to provide a recessed housing for an electric/electronic device that is recess-installable into a ceiling or wall without requiring access to the interior of the housing or access to the exterior of the housing behind the wall.

It is a further object of the present invention to provide a recessed-mounted housing for an electric/electronic device that is insertable and mountable in a ceiling or wall from the front surface of the ceiling or wall.

It is a further object of the present invention to provide a recessed-mounted housing for an electric/electronic device that is self-adjusting to the thickness of the ceiling or wall material.

SUMMARY OF THE INVENTION

A system for mounting a recessed electrical or electronic device housing in (behind) a wall or ceiling surface utilizes a pair of resilient spring clips that are threadedly attached to respective threaded screws that are accessible from the front surface of the housing, so that the recessed-mounted housing may be inserted into a hole in a wall or ceiling and fixedly mounted therein by rotating the screws from the front (ceiling or wall) surface of the housing. Each spring clip includes a bearing tab that bears down against the back side of the wall or ceiling material to sandwich the ceiling material between the bearing tab and an annular flange on the front, open end of the housing. Each threaded screw is journaled in a shouldered bushing in the housing annular flange, the length or depth of the shouldered bushing approximating the thickness of the ceiling or wall material so that, when the spring clip bearing tab bears down against the back side of the ceiling or wall material, the bearing tab is essentially coplanar with the back side of the material in order to distribute the retaining force of the housing and the weight of the housing and its contents over a maximum area of the ceiling or wall material in direct contact with the spring clip bearing tab.

The spring clip is adapted to compress slightly inwardly (toward the housing) as the housing is inserted into a hole in the ceiling or wall material, springing back outwardly in a manner to grip the back side of the ceiling or wall material once the spring clip is beyond the back surface of the ceiling or wall material. Thereafter, tightening the spring clip down against the back side of the ceiling or wall material retains the recessed-mounted housing in place.

DETAILED DESCRIPTION OF THE INVENTION

Figure 1:
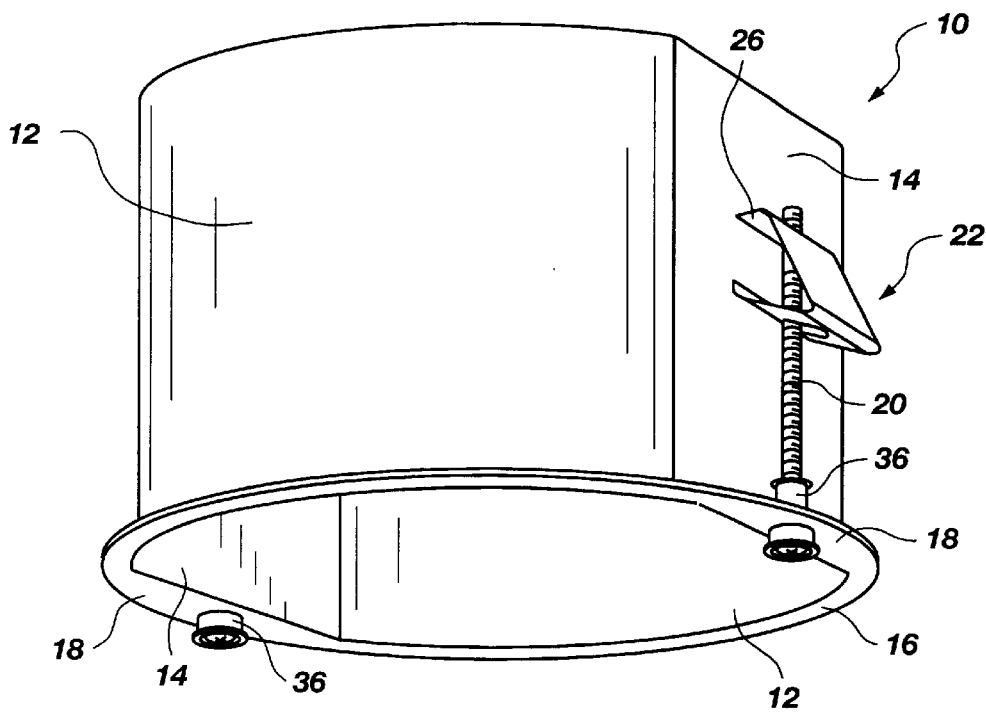
FIG. 1 is a perspective view of the recessed-mounted housing of the present invention, showing one of the two mounting clips therefor.

Turning now to the drawings, and initially to FIG. 1, a recessed-mounted housing 10 is shown in perspective view, as would be seen from below a ceiling. The housing 10 is essentially cylindrical in shape, and comprises two cylindrical side walls 12 and two rectangular flat walls 14 that define diametrically opposed arcuate recesses. The housing 10 is closed on top (not shown) and is open at the bottom. The bottom opening includes an annular flange 16, essentially concentric with and normal to the cylindrical side walls.

The annular flange also includes two diametrically opposed arcuate sections 18 that define the arcuate recesses adjacent the rectangular flat side walls 14.

Each annular flange arcuate section 18 includes a respective threaded screw 20 that is preferably permanently and rotatably journaled in the arcuate section of the annular flange. A resilient spring clip 22 is threadedly attached on the threaded screw at thread members 24 formed in a threaded tab 26 (More clearly shown in FIG. 2).

Figure 2:
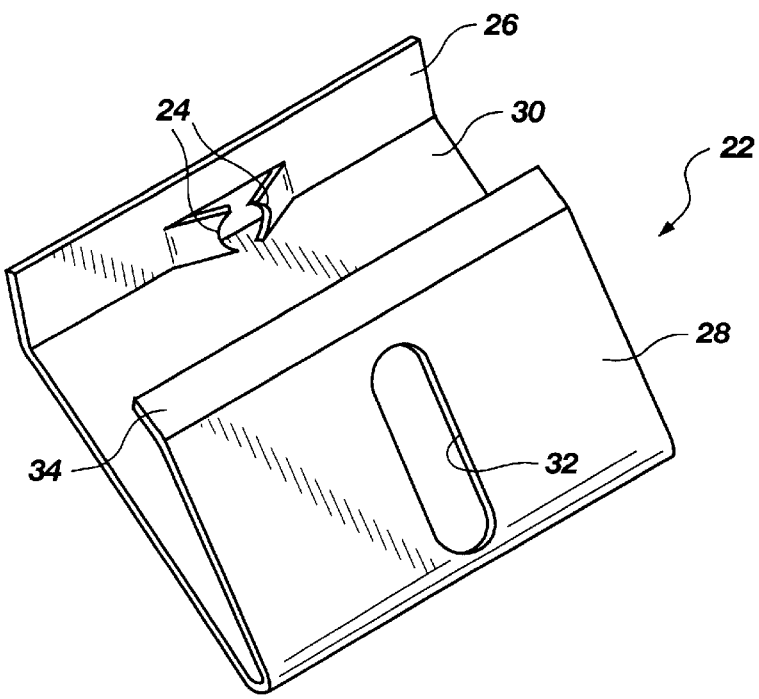
FIG. 2 is a perspective view of a mounting clip used with the recessed-mounted housing of the present invention.

The spring clip 22 is more clearly shown in FIG. 2 to include a bearing tab 28 which is connected by a connecting arm 30 to the threaded tab 26. The bearing tab 28 also includes an elongated hole 32 and a skid tab 34, both to be described in greater detail hereinbelow.

Turning briefly again to FIG. 1, the threaded screw 20 is journaled in a shouldered bushing 36 that is press-fitted into the annular flange arcuate section 18 in a manner to retain the threaded screw in the annular flange arcuate section as shown in FIG. 1. As can be appreciated, with the threaded screw journaled in the annular flange arcuate section, rotation of the screw will drive the spring clip 22 linearly therealong adjacent the flat side wall 14.

Figure 3:
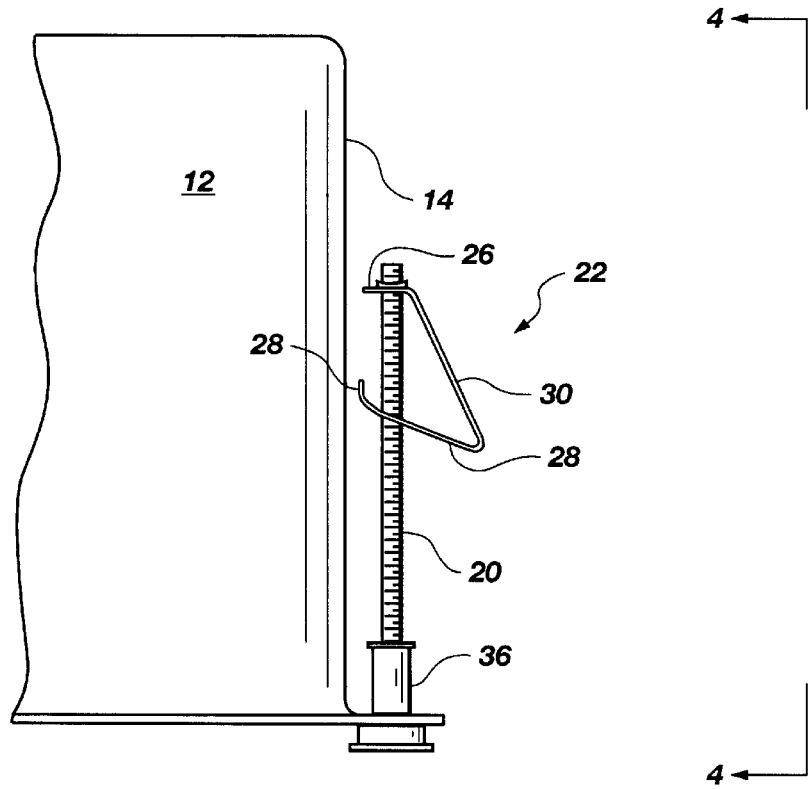
FIG. 3 is a partial side view of the recessed-mounted housing of the present invention, showing the retaining clip in position prior to installation in the mounting hole.

FIG. 3 is a partial side view of the recessed-mounted housing, showing the spring clip 22 in its initial position near the end of the threaded screw 20 prior to insertion into a mounting hole in a drywall or acoustic panel ceiling, for instance. FIGS. 1 and 3 also illustrate the orientation of the spring clip 22 relative to the threaded screw 20, and specifically the position of the threaded screw through the elongated hole 32 in the spring clip. As will be explained in greater detail hereinbelow, the hole 32 is elongated for the purpose of permitting the spring clip to flex (1) inwardly toward the rectangular flat side walls 14 of the housing during insertion of the housing into a hole in the ceiling material, and (2) outwardly away from the rectangular flat side wall in a manner to permit the bearing tab 28 to flatten out against the back side of the ceiling material adjacent the hole in order to retain the recess-mounted housing in position.

Figure 4:
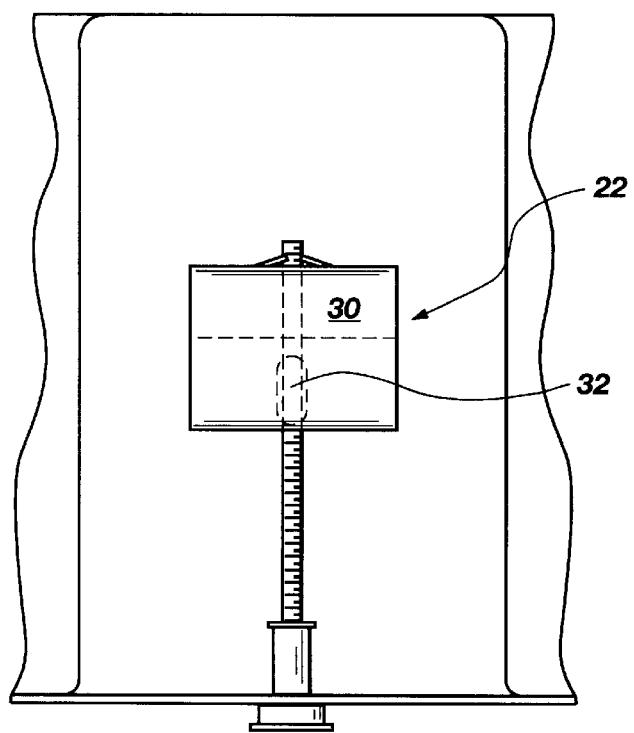
FIG. 4 is a partial front view of the recessed-mounted housing taken along the lines 4—4 in FIG. 3.

FIG. 4 also illustrates the location and position of the spring clip 22 on the threaded screw 20, relative to the rectangular flat side wall 14.

OPERATION

Figure 5:
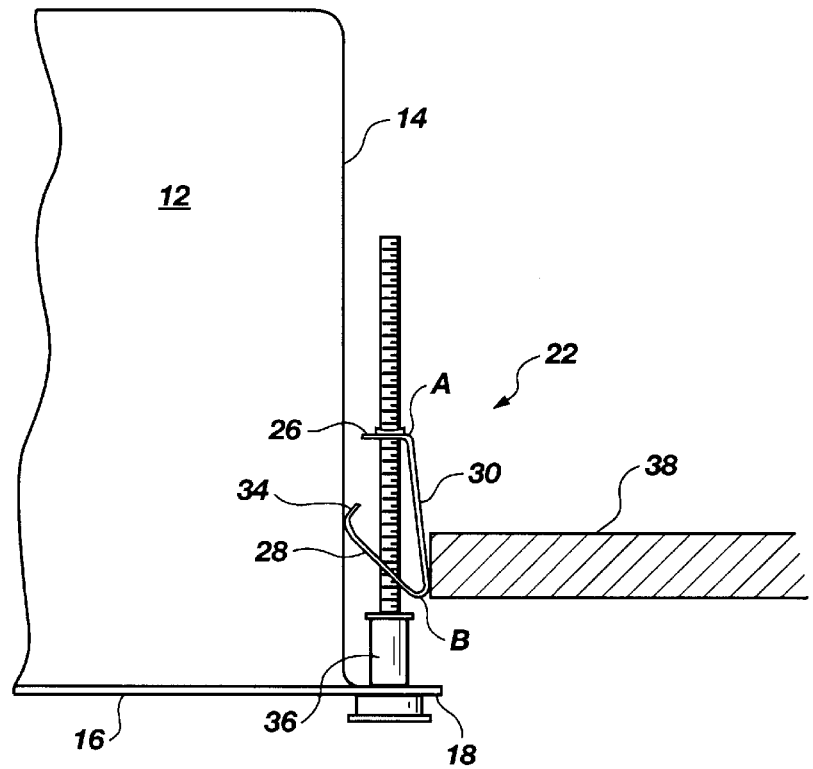
FIG. 5 is a partial side view similar to FIG. 3, illustrating the compression of the spring clip as the recessed-mounted housing is inserted into the mounting hole in the ceiling or wall material.
Figure 6:
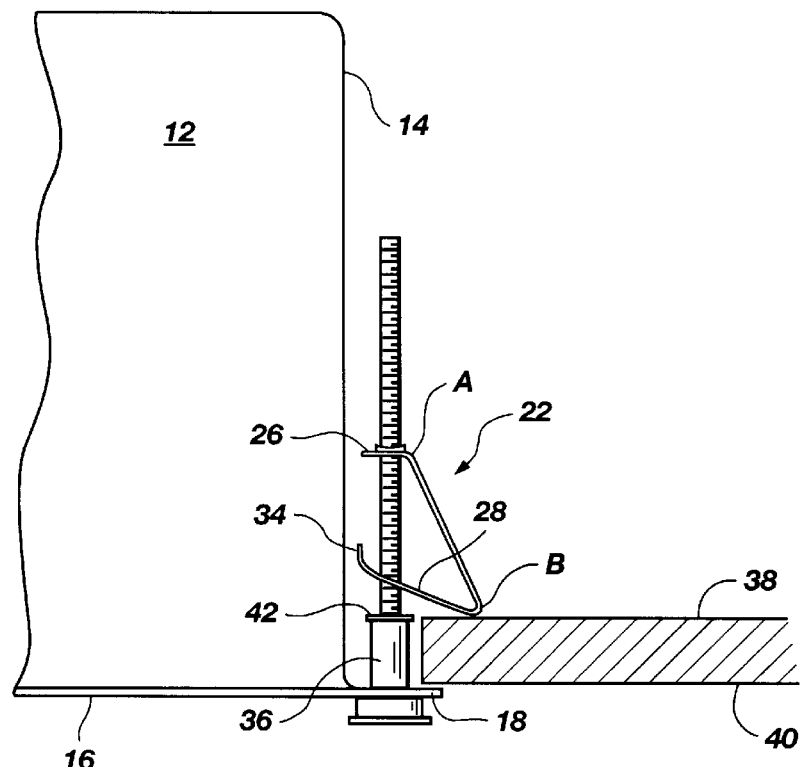
FIG. 6 is a partial side view similar to FIGS. 3 and 5, illustrating the location and position of the mounting clip drawn down against the back surface of the ceiling or wall material to retain the housing in place.

FIGS. 5 and 6 illustrate the positions of the spring clip 22 on the threaded screw (1) during insertion of the housing into a wall or ceiling material hole (FIG. 5), and (2) as the recessed-mounted housing is installed within the hole in the ceiling or wall (FIG. 6). Initially, the threaded screw is rotated to position the spring clip near the end of the threaded screw, or at least far enough up (as shown in FIG. 5) the threaded screw to permit the clip to be inserted beyond the back side 38 of the ceiling material (drywall, suspended acoustic, etc.). It should be appreciated that the present invention contemplates two such spring clip and threaded screw assemblies, positioned diametrically opposed from each other about the housing, and in the respective recesses formed behind (above) the respective annular flange arcuate sections 18 of the housing, as shown in FIG. 1. Therefore, with both of these diametrically opposed spring clips so positioned, the housing is inserted into an essentially circular hole in the ceiling or wall material, the threaded screw and spring clip mechanisms occupying the arcuate space behind (above) the annular flange arcuate sections 18.

As the housing is pushed into and through the hole, the ceiling material compresses the respective spring clips 22 toward the respective rectangular flat side walls 14 of the housing. This causes flexure along the bend defining the connection between the threaded tab 26 and connecting arm 30, indicated at Point A in FIGS. 5 and 6. This inward relative movement of the connecting arm 30 and bearing tab 28 urges the skid tab 34 against the rectangular flat side wall 14, whereupon the skid tab 34 is permitted to slide upwardly (in FIG. 5) against and along the rectangular flat side wall. This also causes increased flexure along the bend defining the connection between the connecting arm 30 and bearing tab 28, indicated at Point B in FIGS. 5 and 6. Those skilled in the art will readily appreciate that this inward flexure of the spring clip toward the housing is also facilitated by the elongate hole 32 in the bearing tab 28 which permits the bearing tab to shift inwardly toward the rectangular flat side wall in response to compression from the ceiling material at the edge of the hole. Those skilled in the art will also readily appreciate that the shouldered bushing 36 retains the threaded screw 20 in the annular flange arcuate section 18 in essentially normal relationship and parallel to the flat side wall during this installation process.

Once both spring clips 22 have been pushed beyond the back surface 38 of the ceiling or wall material, they will automatically "snap" back outwardly (essentially back into the configuration shown in FIG. 6), to temporarily hold the housing within the ceiling material hole, enabling the installer to make the necessary electrical connections, for instance.

The installer next rotates the threaded screw 20 to drive the spring clip 22 down against the top surface 38 of the ceiling material, and pull the annular flange 16 up against the bottom surface 40 of the ceiling material. Further rotation of the screw, of course, drives the threaded tab 26 further downwardly against the top surface 38 of the ceiling material, which causes the connecting arm-bearing tab bend B to slide outwardly (to the right in FIG. 6) against and along the top surface of the ceiling material, and away from the housing 10.

Those skilled in the art will appreciate that this movement of bend B to the right in FIG. 6 against and along the top surface of the ceiling material causes the planar surface of the bearing tab 28 to be urged tightly against the essentially planar top surface of the ceiling material 38 to result in a two-fold positive effect. Specifically, (1) the further to the right in FIG. 6 bend B travels along the top surface of the ceiling material, the more ceiling material the clip is enabled to "bite" into to support the housing and its interior electronic components; and (2) sufficient tightening of the screw will result in the bearing tab 28 being urged down essentially co-planar with the top surface 38 of the ceiling material, so that the combination of the force of the clip against the top side of the ceiling material and the weight of the housing and its components is distributed over essentially the surface area of the spring clip bearing tab, rather than along only a linear contact point, specifically bend B in FIG. 6. This distribution of force and weight over a larger area of surface further from the edge of the hole results in improved support and load-bearing capacity of the recessed-mounted housing of the present invention.

FIGS. 5 and 6 also illustrate another aspect of the current invention, specifically the length of the shouldered bushing 36 above (as shown in FIGS. 5 and 6) the annular flange arcuate section 18. Specifically, the length of this section of the shouldered bushing 18 can be made equal to or approximately equal to the thickness of the ceiling material, so that the bearing tab cannot be forced down into the ceiling material causing fracture or failure. Specifically, as the screw is rotated to tighten the threaded tab 26 downwardly toward the screw head, the left-hand portion of the bearing tab 28 adjacent the skid tab 34 contacts the upper surface 42 of the shouldered bushing to prevent further downward movement of the bearing tab. In this position, the bearing tab is flat against, and essentially co-planar with the ceiling material top surface 38 to provide optimum distribution of force and weight over the largest contact area between the bearing tab and the ceiling material upper surface. Further downward movement of the bearing tab 28 is constrained by the shouldered bushing upper surface, and at this point, resistance to rotation of the screw is dramatically increased, thereby indicating to the installer that the spring clip is down "flush" against the top surface of the ceiling material in its optimum, maximum weight and force distribution position.

From the foregoing it will be seen that this invention is one well adapted to attain all of the ends and objectives herein set forth, together with other advantages which are obvious and which are inherent to the composition and method. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

LIST OF ITEMS IN FIGS. 1–6

10 - recessed-mounted housing
12 - cylindrical sidewalls
14 - rectangular flat side walls
16 - annular flange
18 - annular flange arcuate sections
20 - threaded screw
22 - spring clip
24 - spring threaded members
26 - threaded tab
28 - bearing tab
30 - connecting arm
32 - elongate hole
34 - skid tab
36 - shouldered bushing
38 - ceiling material top surface
40 - ceiling material bottom surface
42 - shouldered bushing upper surface
A - threaded tab/connecting arm bend
B - connecting arm/bearing tab bend

What is claimed is:

1. Mounting structure for a recessed electric fixture housing having sidewalls and a surface-mounting flange essentially normal to the sidewalls, the housing to be mounted in a hole in a support surface having a front side and a back side, the mounting structure comprising:

tightening means mounted with the surface-mounting flange; and a spring clip having:
      a tightening section for receiving the tightening means;
      a surface-bearing section for bearing against the back side of the support surface; and
      a connecting section connecting the tightening section and the surface-bearing section, whereby, as the housing is pushed through the support surface hole, the spring clip may flex toward the housing sidewall and then snap outwardly once beyond the support surface back side, so that the tightening means may draw the spring clip surface-bearing section into contact with the support surface back side to retain the housing in the support surface hole.

2. The mounting structure as set forth in claim 1, wherein the spring clip surface-bearing section includes a clearance hole for the tightening means, whereby the tightening means may pass through the spring clip surface-bearing section.

3. A mounting structure as set forth in claim 1, wherein the spring clip is unitary.

4. A mounting structure as set forth in claim 1, wherein the tightening means is permanently rotatably mounted in the housing surface-mounting flange.

5. A mounting structure as set forth in claim 1, wherein the housing is essentially cylindrical.

6. A mounting structure as set forth in claim 5, wherein the housing has at least one flat surface defining a recess for receiving the tightening means and spring clip therein.

7. A clip for retaining a recessed housing for mounting electrical fixtures behind a wall or ceiling, the housing defining an enclosure having an opening and a flange adjacent the opening, the clip comprising:

a bearing tab adapted to bear against a back surface of the wall or ceiling to retain the housing behind the wall or ceiling;

an arm connected to the bearing tab for urging the tab against the wall or ceiling back surface; and manually actuatable and adjustable tightening means mounted with the arm for manually tightening the bearing tab against the wall or ceiling back surface.

8. The clip as set forth in claim 7, wherein the bearing tab includes a planar surface for bearing against the wall or ceiling back surface.

9. The clip as set forth in claim 7, wherein the tightening means comprises a threaded screw passing through the housing flange and threadedly engaging mating threads formed in the clip.

10. The clip as set forth in claim 9, wherein the threaded screw is permanently and rotatably mounted to the housing flange.

11. The clip as set forth in claim 9, wherein the bearing tab includes a slot therein for receiving the threaded screw therethrough in an orientation to permit the bearing tab to slide outwardly from the housing, as the screw-tightening means is tightened toward the housing flange.

12. The clip as set forth in claim 7, wherein the arm is connected to the bearing tab and tightening means in a manner to urge the bearing tab against the wall or ceiling back surface and outwardly from the housing as the tightening means is tightened toward the housing flange.

13. The clip as set forth in claim 7, wherein the tightening means further comprises a spacer mounted to the housing flange for spacing the bearing tab from the housing flange a distance approximating the thickness of the wall or ceiling.

14. A mounting system for recessed mounting of an electrical fixture behind a wall or ceiling, the mounting system comprising:

a recessed housing for retaining an electrical fixture therein, the housing defining an enclosure having an opening and a flange adjacent the opening; and a clip for retaining the recessed housing behind the wall or ceiling, the clip comprising:
 a bearing tab adapted to bear against a back surface of the wall or ceiling to retain the housing behind the wall or ceiling;
 an arm connected to the bearing tab for urging the tab against the wall or ceiling back surface; and
 manually actuatable and adjustable tightening means connected to the arm for manually tightening the bearing tab against the wall or ceiling back surface.

15. A mounting system as set forth in claim 14, wherein the clip bearing tab includes a planar surface for bearing against the wall or ceiling back surface.

16. A mounting system as set forth in claim 14, wherein the clip tightening means comprises a threaded screw passing through the housing flange and threadedly engaging mating threads formed in the clip.

17. A mounting system as set forth in claim 16, wherein the clip threaded screw is permanently and rotatably mounted to the flange.

18. A mounting system as set forth in claim 16, wherein the clip bearing tab includes a slot therein for receiving the threaded screw therethrough in an orientation to permit the bearing tab to slide outwardly from the housing, as the tightening means is tightened toward the housing flange.

19. A mounting system as set forth in claim 14, wherein the clip arm is connected to the bearing tab and tightening means in a manner to urge the bearing tab against the wall or ceiling back surface and outwardly from the housing as the tightening means is tightened toward the housing flange.

20. A mounting system as set forth in claim 14, wherein the clip tightening means further comprises a spacer mounted to the flange for spacing the bearing tab from the housing flange a distance approximating the thickness of the wall or ceiling.

21. A recessed housing for mounting electrical fixtures behind a wall or ceiling, the housing comprising:

an enclosure having an opening and a flange adjacent the opening; and clip for retaining the recessed housing behind the wall or ceiling, the clip comprising:
a bearing tab adapted to bear against a back surface of the wall or ceiling to retain the housing behind the wall or ceiling;
an arm connected to the bearing tab for urging the bearing tab against the wall or ceiling back surface; and
manually actuatable and adjustable tightening means connected to the arm for manually tightening the bearing tab against the wall or ceiling back surface.

22. A recessed housing as set forth in claim 21, wherein the clip bearing tab includes a planar surface for bearing against the wall or ceiling back surface.

23. A recessed housing as set forth in claim 21, wherein the clip tightening means comprises a threaded screw passing through the housing flange and threadedly engaging mating threads formed in the clip.

24. A recessed housing as set forth in claim 23, wherein the clip threaded screw is permanently and rotatably mounted to the housing flange.

25. A recessed housing as set forth in claim 23, wherein the clip bearing tab includes a slot therein for receiving the threaded screw therethrough in an orientation to permit the bearing tab to slide outwardly from the housing, as the tightening means is tightened toward the housing flange.

26. A recessed housing as set forth in claim 21, wherein the clip arm is connected to the bearing tab and tightening means in a manner to urge the bearing tab against the wall or ceiling back surface and outwardly from the housing as the tightening means is tightened toward the housing flange.

27. A recessed housing as set forth in claim 21, wherein the clip tightening means further comprises a spacer mounted to the housing flange for spacing the bearing tab from the housing flange a distance approximating the thickness of the wall or ceiling.

28. A clip for retaining a recessed housing for mounting electrical fixtures behind a wall or ceiling, the housing defining an enclosure having an opening and a flange adjacent the opening, the clip comprising:

a bearing tab adapted to bear against a back surface of the wall or ceiling to retain the housing behind the wall or ceiling; and an arm connected to the bearing tab for urging the tab against the wall or ceiling back surface; and a threaded screw passing through the housing flange and threadedly engaging mating threads formed in the clip for tightening the bearing tab against the wall or ceiling back surface.

29. The clip as set forth in claim 28, wherein the bearing tab includes a planar surface for bearing against the wall or ceiling back surface.

30. The clip as set forth in claim 28, wherein the arm is connected to the bearing tab and threaded screw in a manner to urge the bearing tab against the wall or ceiling back surface and outwardly from the housing as the threaded screw is tightened to urge the bearing tab toward the housing flange.

31. The clip as set forth in claim 30, wherein the bearing tab includes a slot therein for receiving the threaded screw therethrough in an orientation to permit the bearing tab to slide outwardly from the housing, as the threaded screw is tightened to urge the bearing tab toward the housing flange.

32. The clip as set forth in claim 30, wherein the threaded screw is permanently and rotatably mounted to the housing flange.

33. The clip as set forth in claim 28, further comprising a spacer mounted to the housing flange for spacing the bearing tab from the housing flange a distance approximating the thickness of the wall or ceiling.

34. A mounting system for recessed mounting of an electrical fixture behind a wall or ceiling, the mounting system comprising:

a recessed housing for retaining an electrical fixture therein, the housing defining an enclosure having an opening and a flange adjacent the opening; and a clip for retaining the recessed housing behind the wall or ceiling, the clip comprising:
- a bearing tab adapted to bear against a back surface of the wall or ceiling to retain the housing behind the wall or ceiling; and
- an arm connected to the bearing tab for urging the tab against the wall or ceiling back surface; and a threaded screw passing through the housing flange and threadedly engaging mating threads formed in the clip for tightening the bearing tab against the wall or ceiling back surface.

35. A mounting system as set forth in claim 34, wherein the clip bearing tab includes a planar surface for bearing against the wall or ceiling back surface.

36. A mounting system as set forth in claim 34, wherein the clip arm is connected to the bearing tab and threaded screw in a manner to urge the bearing tab against the wall or ceiling back surface and outwardly from the housing as the threaded screw is tightened to urge the bearing tab toward the housing flange.

37. A mounting system as set forth in claim 36, wherein the clip bearing tab includes a slot therein for receiving the threaded screw therethrough in an orientation to permit the bearing tab to slide outwardly from the housing, as the threaded screw is tightened to urge the bearing tab toward the housing flange.

38. A mounting system as set forth in claim 36, wherein the clip threaded screw is permanently and rotatably mounted to the flange.

39. A mounting system as set forth in claim 34, wherein the clip threaded screw further comprises a spacer mounted to the flange for spacing the bearing tab from the housing flange a distance approximating the thickness of the wall or ceiling.

40. A recessed housing for mounting electrical fixtures behind a wall or ceiling, the housing comprising:
- an enclosure having an opening and a flange adjacent the opening; and
- clip for retaining the recessed housing behind the wall or ceiling, the clip comprising:
  - a bearing tab adapted to bear against a back surface of the wall or ceiling to retain the housing behind the wall or ceiling; and
  - an arm connected to the bearing tab for urging the bearing tab against the wall or ceiling back surface; and
- a threaded screw passing through the housing flange and threadedly engaging mating threads formed in the clip for tightening the bearing tab against the wall or ceiling back surface.

41. A recessed housing as set forth in claim 40, wherein the clip bearing tab includes a planar surface for bearing against the wall or ceiling back surface.

42. A recessed housing as set forth in claim 40, wherein the clip arm is connected to the bearing tab and threaded screw in a manner to urge the bearing tab against the wall or ceiling back surface and outwardly from the housing as the threaded screw is tightened to urge the bearing tab toward the housing flange.

43. A recessed housing as set forth in claim 42, wherein the clip bearing tab includes a slot therein for receiving the threaded screw therethrough in an orientation to permit the bearing tab to slide outwardly from the housing, as the threaded screw is tightened to urge the bearing tab toward the housing flange.

44. A recessed housing as set forth in claim 42, wherein the clip threaded screw is permanently and rotatably mounted to the housing flange.

45. A recessed housing as set forth in claim 40, wherein the clip threaded screw further comprises a spacer mounted to the housing flange for spacing the bearing tab from the housing flange a distance approximating the thickness of the wall or ceiling.

* * * * *